(12) United States Patent
Sasaki et al.

(10) Patent No.: US 11,221,071 B2
(45) Date of Patent: Jan. 11, 2022

(54) SLIDING COMPONENT

(71) Applicant: Eagle Industry Co., Ltd., Tokyo (JP)

(72) Inventors: Yuki Sasaki, Tokyo (JP); Tetsuzo Okada, Tokyo (JP); Masatoshi Itadani, Tokyo (JP); Takeshi Hosoe, Tokyo (JP)

(73) Assignee: EAGLE INDUSTRY CO., LTD.

( * ) Notice: Subject to any disclaimer, the term of this patent is extended or adjusted under 35 U.S.C. 154(b) by 169 days.

(21) Appl. No.: 16/640,324

(22) PCT Filed: Sep. 4, 2018

(86) PCT No.: PCT/JP2018/032701
§ 371 (c)(1),
(2) Date: Feb. 19, 2020

(87) PCT Pub. No.: WO2019/049847
PCT Pub. Date: Mar. 14, 2019

(65) Prior Publication Data
US 2021/0080006 A1 Mar. 18, 2021

(51) Int. Cl.
*F16J 15/34* (2006.01)
*F16J 15/16* (2006.01)
*F16C 17/04* (2006.01)

(52) U.S. Cl.
CPC ............. *F16J 15/164* (2013.01); *F16C 17/04* (2013.01); *F16J 15/34* (2013.01)

(58) Field of Classification Search
CPC ........ F16J 15/164; F16J 15/34; F16J 15/3408; F16J 15/3416; F16J 15/342; F16C 17/04
See application file for complete search history.

(56) References Cited

U.S. PATENT DOCUMENTS

| 3,804,424 | A | 4/1974 | Gardner .................. F16J 15/34 |
| 9,353,867 | B2 | 5/2016 | Itadani et al. ........ F16J 15/3448 |
| 9,677,670 | B2 | 6/2017 | Itadani et al. ........ F16J 15/3412 |
| 9,765,892 | B2 | 9/2017 | Itadani et al. ........... F16J 15/34 |
| 9,841,106 | B2 | 12/2017 | Itadani et al. ........... F16J 15/34 |
| 9,850,953 | B2 | 12/2017 | Tokunaga ............. F16C 33/741 |
| 2014/0217676 | A1 | 8/2014 | Hosoe et al. ............ F16J 15/34 |
| 2015/0097341 | A1 | 4/2015 | Inoue et al. ......... F16J 15/3424 |

(Continued)

FOREIGN PATENT DOCUMENTS

| CN | 105793628 | 7/2016 | ............... F16J 15/34 |
| CN | 106104112 | 11/2016 | ............... F16J 15/35 |

(Continued)

OTHER PUBLICATIONS

Office Action issued in Chinese Patent Appln. No. 201880055818, dated May 5, 2021, with English translation, 11 pages.

(Continued)

*Primary Examiner* — Gilbert Y Lee
(74) *Attorney, Agent, or Firm* — Hayes Soloway P.C.

(57) ABSTRACT

Provided is a sliding component with less fluid leakage. A sliding component has a pair of sliding members at least one of which has positive pressure generation mechanisms and negative pressure generation mechanisms formed at a sliding surface of the sliding member. The negative pressure generation mechanisms are arranged on a low-pressure fluid side with respect to the positive pressure generation mechanisms. Adjoining two of the negative pressure generation mechanisms in a circumferential direction overlap with each other in a radial direction.

12 Claims, 11 Drawing Sheets

(56) References Cited

U.S. PATENT DOCUMENTS

| | | | |
|---|---|---|---|
| 2015/0115537 A1 | 4/2015 | Tokunaga | F16J 15/34 |
| 2015/0123350 A1 | 5/2015 | Itadani et al. | F16J 15/3412 |
| 2016/0033045 A1 | 2/2016 | Itadani et al. | F16J 15/3412 |
| 2018/0073394 A1 | 3/2018 | Tokunaga et al. | F01D 25/18 |
| 2018/0128377 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0299015 A1 | 10/2018 | Itadani | F16J 15/3448 |
| 2019/0301522 A1 | 10/2019 | Negishi et al. | F16C 17/026 |

FOREIGN PATENT DOCUMENTS

| | | | |
|---|---|---|---|
| EP | 2 977 654 | 1/2016 | F16J 15/34 |
| EP | 3 091 258 | 11/2016 | F16J 15/34 |
| EP | 3 543 569 | 9/2019 | F16J 15/34 |
| JP | 50-45155 | 4/1975 | F16J 15/34 |
| JP | 56-15856 | 2/1981 | F16J 15/34 |
| JP | 4-50559 | 2/1992 | F16J 15/34 |
| JP | 7-71618 | 3/1995 | F16J 15/34 |
| JP | 8-502809 | 3/1996 | F16J 15/34 |
| JP | 3079562 | 6/2000 | F16J 15/34 |
| JP | 2012-2295 | 1/2012 | F16J 15/34 |
| JP | 2012-159152 | 8/2012 | F16J 15/34 |
| JP | 2017-141962 | 8/2017 | F16J 15/34 |
| WO | WO 95/06212 | 3/1995 | F16J 15/34 |
| WO | WO2012046749 | 4/2012 | F16C 17/04 |
| WO | WO 2013/035503 | 3/2013 | F16J 15/34 |
| WO | WO 2013/176009 | 11/2013 | F16J 15/34 |
| WO | WO 2014/024742 | 2/2014 | F16J 15/34 |
| WO | WO2014148317 | 9/2014 | F16J 15/34 |
| WO | WO2015199171 | 12/2015 | F16J 15/34 |
| WO | WO2015199172 | 12/2015 | F16J 15/34 |
| WO | WO 2016/167262 | 10/2016 | F16J 15/34 |
| WO | WO 2016/186015 | 11/2016 | F16J 15/34 |
| WO | WO 2016/186019 | 11/2016 | F16J 15/08 |
| WO | WO 2016/203878 | 12/2016 | F16J 15/34 |
| WO | WO2017061406 | 4/2017 | F16J 15/34 |
| WO | WO 2018/105505 | 6/2018 | F16C 33/12 |

OTHER PUBLICATIONS

Office Action issued in Korean Patent Appln. No. 10-2020-7006713, dated Jun. 28, 2021, with English translation, 11 pages.
U.S. Appl. No. 17/428,262, filed Aug. 3, 2021, Imura et al.
U.S. Appl. No. 17/428,912, filed Aug. 5, 2021, Ou et al.
U.S. Appl. No. 17/425,679, filed Jul. 23, 2021, Ou et al.
International Search Report and Written Opinion issued in PCT/JP2020/005259, dated Apr. 7, 2020, with English translation, 23 pages.
International Preliminary Report on Patentability issued in PCT/JP2020/005259, dated Aug. 10, 2021, 13 pages.
International Search Report and Written Opinion issued in PCT/JP2020/005258, dated Apr. 14, 2020, with English translation, 12 pages.
International Preliminary Report on Patentability issued in PCT/JP2020/005258, dated Aug. 10, 2021, 6 pages.
International Search Report and Written Opinion issued in PCT/JP2020/003646, dated Mar. 17, 2020, with English translation, 12 pages.
International Preliminary Report on Patentability issued in PCT/JP2020/003646, dated Aug. 10, 2021, 6 pages.
Extended European Search Report issued in EPO Patent Appln. Serial No. 18854406.8, dated Apr. 12, 2021, 8 pages.
International Preliminary Report on Patentability issued in PCT/JP2018/032701, dated Mar. 10, 2020, 8 pages.
International Search Report (w/translation) and Written Opinion (w/machine translation) issued in application No. PCT/JP2018/032701, dated Nov. 27, 2018 (17 pgs).

Fig.2
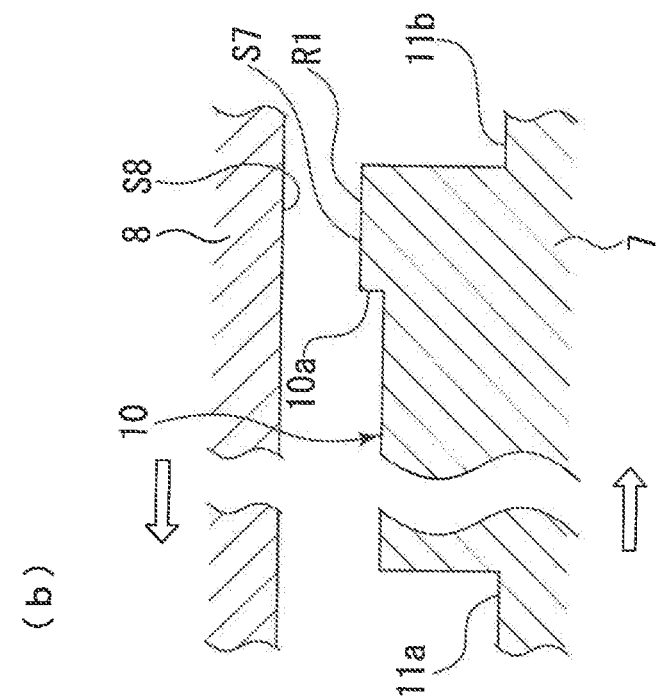
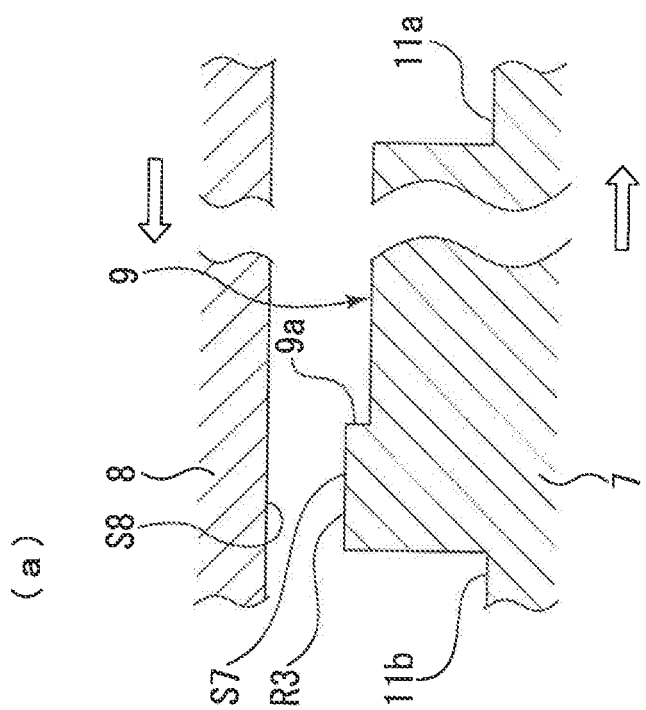

SLIDING COMPONENT

TECHNICAL FIELD

The present invention relates to a sliding component used for, e.g., a mechanical seal or a bearing.

BACKGROUND ART

A typical sliding component used for, e.g., a mechanical seal or a bearing has a pair of sliding members. At one of the sliding members, a positive pressure generation mechanism such as a spiral groove, a dimple, or a Rayleigh step is provided. Upon sliding, dynamic pressure (positive pressure) is generated between the pair of sliding members, and therefore, a fluid film is formed between the pair of sliding members to realize improvement of both of sealability and lubricity.

A pair of sliding members described in Patent Citation 1 is used for a mechanical seal. At one of the sliding members, a Rayleigh step is provided on an outer diameter side as a high-pressure fluid side, and a reverse Rayleigh step is provided on an inner diameter side as a low-pressure fluid side. Thus, upon sliding, suction (pumping) is caused at the reverse Rayleigh step, and therefore, high-pressure sealing target fluid leaked from the Rayleigh step can be sucked. In this manner, the sealing target fluid between the pair of sliding members is prevented from leaking to the low-pressure fluid side.

CITATION LIST

Patent Literature

Patent Citation 1: WO 2012/046749 A (pages 14 to 16, FIG. 1)

SUMMARY OF INVENTION

Technical Problem

However, in Patent Citation 1, slight leakage to the low-pressure fluid side might be caused depending on, e.g., the number of reverse Rayleigh steps and arrangement of the reverse Rayleigh step, and for this reason, further improvement has been demanded. Such tendency becomes more noticeable in the case of an outside-mechanical-seal-type mechanical seal configured such that high-pressure fluid is positioned on an inner diameter side of the sliding member, a Rayleigh step is provided on the inner diameter side, and a reverse Rayleigh step is provided on an outer diameter side of the sliding member.

The present invention has been made in view of such a problem, and an object of the present invention is to provide a sliding component with less fluid leakage.

Solution to Problem

For solving the above-described problem, a sliding component according to a first aspect of the present invention is a sliding component comprising a pair of sliding members at least one of which has positive pressure generation mechanisms and negative pressure generation mechanisms formed at a sliding surface of the sliding member, the negative pressure generation mechanisms being arranged on a low-pressure fluid side with respect to the positive pressure generation mechanisms, wherein adjoining two of the negative pressure generation mechanisms in a circumferential direction overlap with each other in a radial direction.

According to the first aspect, the adjoining two of the negative pressure generation mechanisms in the circumferential direction are continuously formed in the circumferential direction as viewed from the radial direction. Thus, even when sealing target fluid leaks at any position of the sliding member in the circumferential direction, such sealing target fluid is sucked by the negative pressure generation mechanisms, and therefore, leakage of the sealing target fluid to the low-pressure fluid side can be suppressed.

Preferably, in the sliding component according to a second aspect of the present invention, each of the negative pressure generation mechanisms has a negative pressure generation part and a fluid discharge part, the negative pressure generation part of a first one of the adjoining two of the negative pressure generation mechanisms is arranged on the low-pressure fluid side with respect to the fluid discharge part of a second one of the adjoining two of the negative pressure generation mechanisms.

According to the second aspect, the sealing target fluid having leaked from the fluid discharge part of the negative pressure generation mechanism in which leakage of the sealing target fluid is easily caused can be sucked by the negative pressure generation part of the negative pressure generation mechanism with strong suction force, and therefore, leakage of the sealing target fluid to the low-pressure fluid side can be effectively suppressed.

Preferably, in the sliding component according to a third aspect of the present invention, each of the negative pressure generation mechanisms is a reverse Rayleigh step.

According to the third aspect, the reverse Rayleigh step itself is in one groove shape extending in the circumferential direction without disconnection, and therefore, leakage of the sealing target fluid to the low-pressure fluid side can be more reliably suppressed.

Preferably, in the sliding component according to a fourth aspect of the present invention, each of the positive pressure generation mechanisms is a Rayleigh step having a fluid inflow part, and the sliding member has, at the sliding surface thereof, a fluid introduction groove connecting the fluid discharge part of the reverse Rayleigh step and the fluid inflow part of the Rayleigh step to a high-pressure fluid side.

According to the fourth aspect, the negative pressure can be reliably generated in the reverse Rayleigh step, and therefore, leakage of the sealing target fluid from the Rayleigh step to the low-pressure fluid side can be reliably sucked.

Preferably, in the sliding component according to a fifth aspect of the present invention, the fluid introduction groove is a circulation groove having an inlet and an outlet both of which communicate with the high-pressure fluid side.

According to the fifth aspect, the sealing target fluid can be reliably introduced into the Rayleigh step by the circulation groove, and can be reliably discharged from the reverse Rayleigh step.

Preferably, in the sliding component according to a sixth aspect of the present invention, the Rayleigh step is isolated from the low-pressure fluid side by the circulation groove.

According to the sixth aspect, the circulation groove is present on an outer diameter side of the Rayleigh step, and therefore, leakage of the sealing target fluid from the Rayleigh step to the low-pressure fluid side can be doubly prevented by the circulation groove and the reverse Rayleigh step.

Preferably, in the sliding component according to a seventh aspect of the present invention, the low-pressure fluid side is an outer diameter side of the sliding member and the high-pressure fluid side is an inner diameter side of the sliding member.

According to the seventh aspect, leakage of the sealing target fluid from the high-pressure fluid side to the low-pressure fluid side due to centrifugal force can be prevented.

BRIEF DESCRIPTION OF DRAWINGS

FIG. 2A is a schematic view of a Rayleigh step, and FIG. 2B is a schematic view of a reverse Rayleigh step in the first embodiment.

DESCRIPTION OF EMBODIMENTS

Modes for carrying out a sliding component according to the present invention will be described below based on embodiments.

First Embodiment

Figure 1:
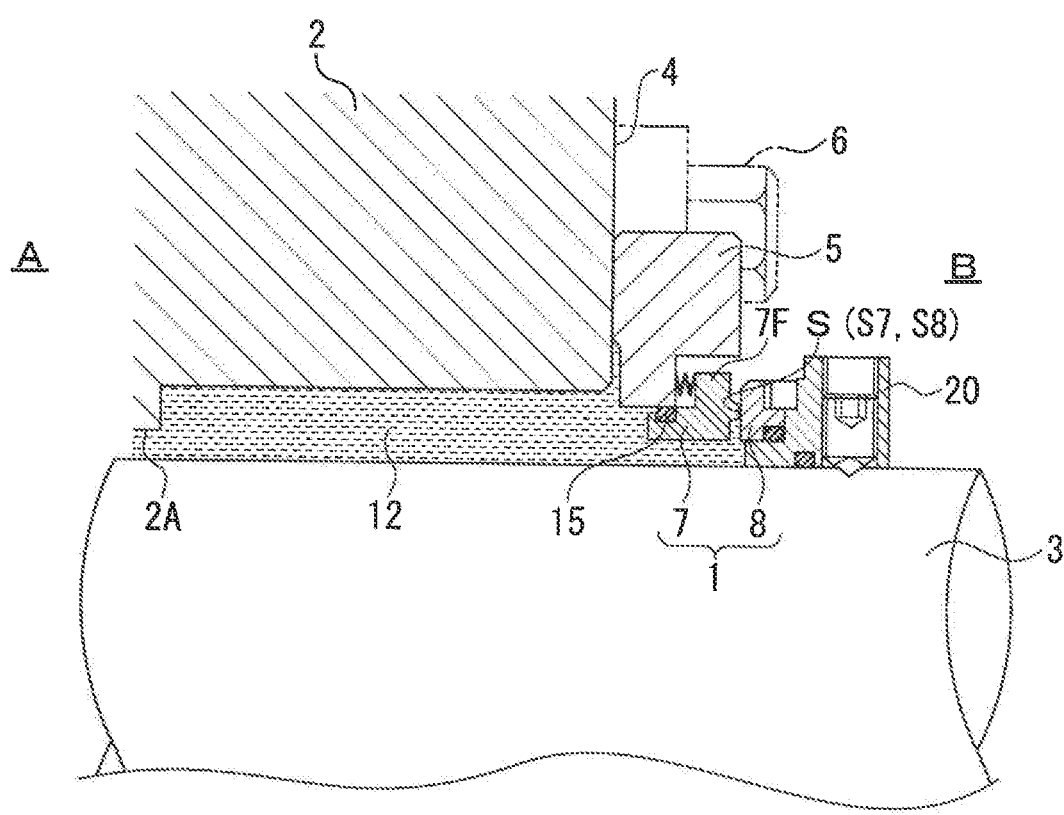
FIG. 1 is a longitudinal sectional view of one example of a mechanical seal including a sliding component according to a first embodiment of the present invention.

As illustrated in FIG. 1, a mechanical seal 1 including the sliding component according to the first embodiment of the present invention is for sealing a seal cavity between a housing 2 of, e.g., a hot water pump or a hot oil pump such as a boiler feed pump or a condensate pump in a thermal power plant and a rotary shaft 3 fitted in a shaft fitting hole 2A of the housing 2, and the mechanical seal 1 is attached to between the housing 2 and the rotary shaft 3. In FIG. 1, the left side is a machine inner A side, and the right side is a machine outer B side (e.g., an atmosphere side).

The rotary shaft 3 is provided to penetrate the shaft fitting hole 2A of the housing 2. A seal cover 5 is, with fixing means such as a bolt 6, attached to a machine-outer-B-side surface 4 around the shaft fitting hole 2A of the housing 2, and in a space inside the seal cover 5 and outside the rotary shaft 3, a stationary-side sealing element (hereinafter referred to as a "seal ring") 7 and a rotary-side sealing element (hereinafter referred to as a "mating ring") 8 as sliding members forming the mechanical seal 1 are arranged.

The seal ring 7 has a flange 7F, and a guide groove (not shown) extending in an axial direction is formed at the flange 7F. A fixing pin (not shown) extending from the seal cover 5 in the axial direction is inserted into the guide groove, and the fixing pin allows movement of the seal ring 7 in the axial direction and restricts movement of the seal ring 7 in a rotation direction. Moreover, the seal ring 7 is biased toward a mating ring 8 side by coil springs 15 arranged at equal intervals along a circumferential surface between the seal ring 7 and the seal cover 5. Further, the mating ring 8 is fixed to a collar 20 fixed to the rotary shaft 3, and is rotatable in association with rotation of the rotary shaft 3.

The mechanical seal 1 is in the form of an outside mechanical seal configured to seal sealing target fluid 12 tending to flow in an outer circumferential direction from the inner periphery between a sliding surface S7 of the seal ring 7 and a sliding surface S8 of the mating ring 8. At the sliding surface S7 of the seal ring 7, Rayleigh steps 9 as positive pressure generation mechanisms and reverse Rayleigh steps 10 as negative pressure generation mechanisms are separately provided (see FIGS. 2 and 3). Note that the positive pressure generation mechanisms are not limited to the Rayleigh steps 9, and for example, may be spiral grooves or dimples.

Next, the outlines of the Rayleigh steps 9 and the reverse Rayleigh steps 10 will be described based on FIG. 2. Note that forms in which the Rayleigh steps 9 and the reverse Rayleigh steps 10 are provided at the sliding surface S7 of the seal ring 7 and in which the sliding surface S8 of the mating ring 8 is formed flat, will be described below. Hereinafter, when the seal ring 7 and the mating ring 8 rotate relative to each other, a downstream side (the left side on the plane of paper of FIG. 2) of the sealing target fluid 12 flowing in the Rayleigh steps 9 and the reverse Rayleigh steps 10 will be described as a relative rotation start point side of the seal ring 7, and an upstream side (the right side on the plane of paper of FIG. 2) of the sealing target fluid 12 flowing in the Rayleigh steps 9 and the reverse Rayleigh steps 10 will be described as a relative rotation end point side of the seal ring 7.

In FIG. 2A, the seal ring 7 and the mating ring 8 as the sliding members facing each other slide relative to each other as indicated by arrows. At the sliding surface S7 of the seal ring 7, the Rayleigh steps 9 are formed along a circumferential direction of the seal ring 7. Each of the Rayleigh step includes a groove, recess or dimple, and a wall portion 9a perpendicular to the rotation direction formed at an end portion of the groove, recess or dimple on the relative rotation start point side of the seal ring 7. Moreover, the Rayleigh step 9 communicates, on the relative rotation end point side of the seal ring 7, with an inlet portion 11a of a fluid circulation groove 11 described later. Moreover, a land portion R3 as the sliding surface S7 is formed on the relative rotation start point side with respect to the wall portion 9a of the Rayleigh step 9, and an outlet portion 11b of the fluid circulation groove 11 described later is arranged on the further relative rotation start point side with respect to the land portion R3. Note that the wall portion 9a is not limited to one perpendicular to the rotation direction, and for example, may be inclined with respect to the rotation direction.

When the seal ring 7 and the mating ring 8 move relative to each other in a direction indicated by the arrows, fluid interposed between the sliding surfaces 37, 38 of the seal ring 7 and the mating ring 8 tends, due to viscosity thereof, to move to follow the seal ring 7 and the mating ring 8 in a movement direction thereof, and therefore, positive pressure (dynamic pressure) is generated in the Rayleigh step 9 at this point. Note that the vicinity of the wall portion 9a as the end portion of the Rayleigh step 9 on the relative rotation start point side is under the highest pressure, and the pressure gradually decreases toward the relative rotation end point side of the seal ring 7.

As illustrated in FIG. 2B, the reverse Rayleigh steps 10 are formed along the circumferential direction of the seal ring 7 at the sliding surface 37 of the seal ring 7. Each of the reverse Rayleigh steps 10 includes a groove, recess or dimple, and a wall portion 10a perpendicular to the rotation direction formed on the relative rotation end point side of the seal ring 7. Moreover, the reverse Rayleigh step 10 communicates, on the relative rotation start point side, with the inlet portion 11a of the fluid circulation groove 11 described later. Further, a land portion R1 as the sliding surface S7 is formed on the relative rotation end point side with respect to the wall portion 10a of the reverse Rayleigh step 10, and the outlet portion 11b of the fluid circulation groove 11 described later is arranged on the further relative rotation end point side with respect to the land portion R1. Note that the wall portion 10a is not limited to one perpendicular to the rotation direction, and for example, may be inclined with respect to the rotation direction.

When the seal ring 7 and the mating ring 8 move relative to each other in the direction indicated by the arrows, fluid interposed between the sliding surfaces S7, S8 of the seal ring 7 and the mating ring 8 tends, due to viscosity thereof, to move to follow the seal ring 7 and the mating ring 8 in the movement direction thereof, and therefore, negative pressure (dynamic pressure) is generated in the reverse Rayleigh step 10 at this point. Note that the vicinity of the wall portion 10a as the end portion of the reverse Rayleigh step 10 on the relative rotation end point side is under the lowest pressure, and the pressure gradually increases toward the relative rotation start point side of the seal ring 7.

Next, the arrangement and shapes of the Rayleigh steps 9, the reverse Rayleigh steps 10, and the fluid circulation grooves 11 at the seal ring 7 will be described based on FIGS. 3 to 6.

Figure 3:
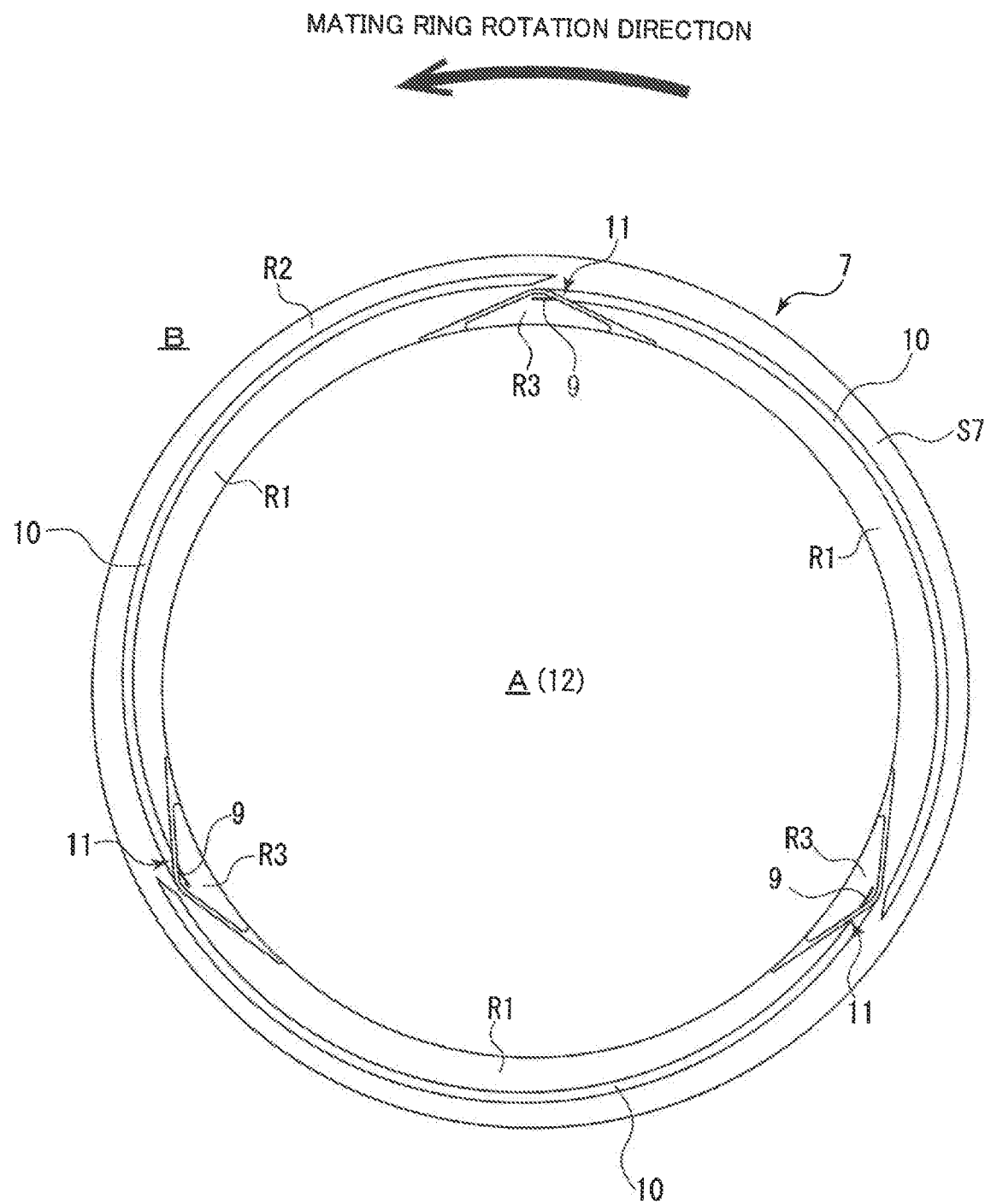
FIG. 3 is a view of a sliding surface of a seal ring from an axial direction in the first embodiment.

In FIG. 3, an inner peripheral side of the sliding surface S7 of the seal ring 7 is the machine inner A side as a high-pressure fluid side, and an outer peripheral side of the sliding surface S7 of the seal ring 7 is the machine outer B side as a low-pressure fluid side (e.g., the atmosphere side). Moreover, in FIG. 3, the sliding surface S8 (i.e., a mating sliding surface) of the mating ring 8 rotates in a counterclockwise direction, i.e., a direction indicated by a black arrow), and the sliding surface S7 of the seal ring 7 does not rotate.

As illustrated in FIG. 3, three fluid circulation grooves 11 are arranged at equal intervals in the circumferential direction at the sliding surface S7 of the seal ring 7. The fluid circulation grooves 11 communicate with the machine inner A side, and are isolated from the machine outer B side by the land portions R1, R2 of the sliding surface S7.

Figure 4:
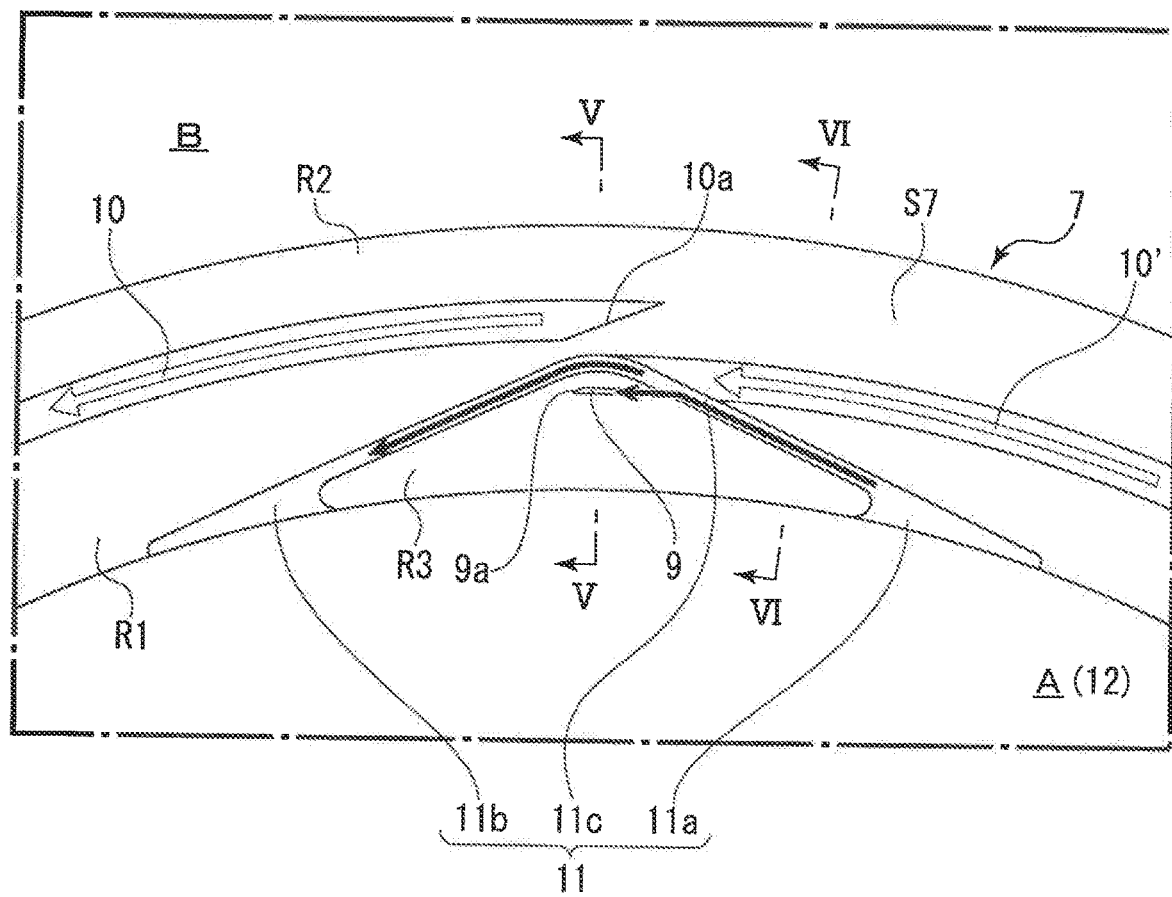
FIG. 4 is an enlarged view of a main portion of the sliding surface of the seal ring in the first embodiment.

As illustrated in FIGS. 3 and 4, the fluid circulation groove 11 includes the inlet portion 11a into which the sealing target fluid 12 enters from the machine inner A side, a substantially V-shaped passage portion 11c, and the outlet portion 11b through which the sealing target fluid 12 passes toward the machine inner A side. The passage portion 11c connected to the inlet portion 11a and the outlet portion 11b is inclined with respect to the circumferential direction such that both slope portions of the passage portion 11c extend close to each other toward an outer diameter side. That is, the fluid circulation groove 11 is in a substantially V-shape opening to an inner diameter side of the seal ring 7 as viewed from the axial direction. Note that an inlet portion 11a side and an outlet portion 11b side of the passage portion 11c expand, for example, toward the machine inner A side with respect to a bent portion of the passage portion 11c, are formed symmetrically, and are set such that a crossing angle between the inlet portion 11a side and the outlet portion 11b side of the passage portion 11c is an obtuse angle (e.g., about 120°).

The fluid circulation groove 11 is isolated from the machine outer B side by part of the land portions R1, R2. For preventing condensation of fluid containing a corrosion product etc. between the sliding surfaces S7, S8, the fluid circulation groove 11 plays a role in actively introducing and discharging the sealing target fluid 12 from the machine inner A side to between the sliding surfaces S7, S8. The fluid circulation groove 11 is formed with the inlet portion 11a and the outlet portion 11b such that the sealing target fluid 12 is easily taken in and discharged from between the sliding surfaces S7, S8 along the rotation direction of the mating ring 8. Moreover, for reducing leakage, the fluid circulation groove 11 is isolated from the machine outer B side by part of the land portions R1, R2. Note that inner-diameter-side end portions of the inlet portion 11a and the outlet portion 11b are, for smoothly taking the sealing target fluid 12 in or out, formed longer in the circumferential direction than other portions.

The Rayleigh step 9 is formed at a portion surrounded by the fluid circulation groove 11 and the machine inner A side. That is, three Rayleigh steps 9 are arranged at equal intervals in the circumferential direction of the seal ring 7.

Specifically, as illustrated in FIG. 4, the Rayleigh step 9 linearly extends from the inlet portion 11a side of the passage portion 11c of the fluid circulation groove 11 toward the relative rotation start point side of the seal ring 7, and the wall portion 9a as the end portion of the Rayleigh step 9 on the relative rotation start point side of the seal ring 7 is isolated from the outlet portion 11b side of the passage portion 11c of the fluid circulation groove 11 by the land portion R3. The Rayleigh step 9 communicates with the inlet portion 11a side of the passage portion 11c of the fluid circulation groove 11. Thus, when the seal ring 7 and the mating ring 8 move relative to each other, the sealing target fluid 12 is taken in the Rayleigh step 9 from the inlet portion 11a side of the passage portion 11c, and the positive pressure is generated in the Rayleigh step 9 (see black arrows of FIG. 4). As described above, the positive pressure is generated in the Rayleigh step 9, and therefore, the seal ring 7 and the mating ring 8 are separated from each other and a fluid film is formed between the sliding surfaces S (i.e., S7, S8). Thus, lubrication performance is improved.

A machine-inner-A-side wall of the Rayleigh step 9 extends longer to the relative rotation start point side of the seal ring 7 than a machine-outer-B-side wall of the Rayleigh step 9. That is, the wall portion 9a connecting the machine-inner-A-side wall and the machine-outer-B-side wall of the Rayleigh step 9 is formed narrowed toward the machine inner A side.

As illustrated in FIGS. 3 and 4, three reverse Rayleigh steps 10 are arranged at equal intervals in the circumferential direction of the sliding surface S7 of the seal ring 7. Specifically, the reverse Rayleigh step 10 is in an arc shape extending in the circumferential direction of the seal ring 7. Each of the reverse Rayleigh steps has a wall portion 10a (i.e., a negative pressure generation part) at one end and an opposite end portion (i.e., a fluid discharge part) at the other end. Particularly, as illustrated in FIG. 4, the wall portion 10a of the reverse Rayleigh step 10 is, through the land portion R1, arranged on the machine outer B side (the outer diameter side) with respect to the opposite end portion (i.e., the fluid discharge part) of the circumferentially-adjoining reverse Rayleigh step 10' communicating with the inlet portion 11*a* side of the passage portion 11*c* of the fluid circulation groove 11, and the wall portion 10*a* (i.e., the negative pressure generation part) of the reverse Rayleigh step 10 and the opposite end portion (i.e., the fluid discharge part) of the reverse Rayleigh step 10' overlap with each other as viewed from a radial direction. That is, three reverse Rayleigh steps 10 are, without disconnection, continuously arranged in the circumferential direction when the seal ring 7 is viewed from the radial direction. Moreover, the fluid discharge part of the reverse Rayleigh step 10 partially has an arc shape along the substantially circumferential direction, and the negative pressure generation part of the reverse Rayleigh step 10 is positioned on the outer diameter side with respect to the fluid discharge part of the reverse Rayleigh step 10'.

When the seal ring 7 and the mating ring 8 move relative to each other, the negative pressure is generated in the reverse Rayleigh step 10, and therefore, the sealing target fluid 12 in the vicinity of the reverse Rayleigh step 10 can be sucked. Thus, leakage of the sealing target fluid 12 to the machine outer B side from between the sliding surfaces S7, S8 can be suppressed. Moreover, the sealing target fluid 12 sucked into the reverse Rayleigh step 10 is discharged to the inlet portion 11*a* side of the passage portion 11*c* of the fluid circulation groove 11 (see white arrows of FIG. 4).

Further, a machine-outer-B-side wall of the reverse Rayleigh step 10 extends longer to a reverse Rayleigh step 10' side than a machine-inner-A-side wall of the reverse Rayleigh step 10. That is, the wall portion 10*a* connecting the machine-inner-A-side wall and the machine-outer-B-side wall of the reverse Rayleigh step 10 is formed narrowed toward the machine outer B side.

Figure 5:
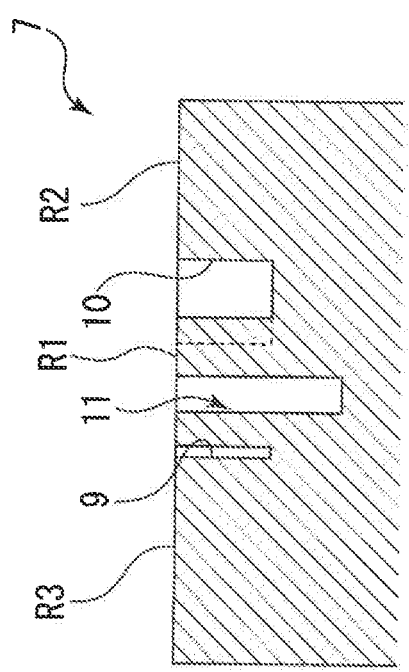
FIG. 5 is a V-V sectional view in FIG. 4.
Figure 6:
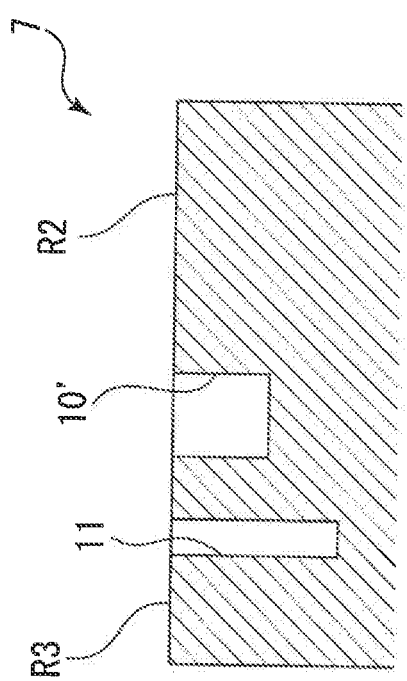
FIG. 6 is a VI-VI sectional view in FIG. 4.

As illustrated in FIGS. 5 and 6, the fluid circulation groove 11 is formed deeper than the Rayleigh step 9 and the reverse Rayleigh step 10, and the Rayleigh step 9 and the reverse Rayleigh step 10 are formed with the substantially same depth. The Rayleigh step 9, the reverse Rayleigh step 10, and the fluid circulation groove 11 are formed by irradiation of, e.g., picosecond laser or femtosecond laser. In the present embodiment, the depths of the Rayleigh step 9 and the reverse Rayleigh step 10 are several μm, and the depth of the fluid circulation groove 11 is several tens of sm. Moreover, the width of the Rayleigh step 9 is 0.02 to 0.03 mm, the width of the reverse Rayleigh step 10 is 0.2 to 0.3 mm, and the width of the fluid circulation groove 11 is 0.1 to 0.15 mm.

Note that in FIG. 5, the depths of the Rayleigh step 9, the reverse Rayleigh step 10, and the fluid circulation groove 11 are emphatically illustrated for the sake of simplicity in description. Further, note that the depths and widths of the Rayleigh step 9, the reverse Rayleigh step 10, and the fluid circulation groove 11 can be set to optimal depths and widths according to, e.g., the pressure and type (viscosity) of the sealing target fluid, as necessary.

Moreover, as illustrated in FIGS. 3 to 6, the above-described land portion R1 is the sliding surface S7 of the seal ring 7 positioned on the inner diameter side of the reverse Rayleigh step 10, the land portion R2 is the sliding surface S7 of the seal ring 7 positioned on the outer diameter side of the reverse Rayleigh step 10, and the land portion R3 is the sliding surface S7 of the seal ring 7 positioned on the inner diameter side of the fluid circulation groove 11 (i.e., in an area surrounded by the fluid circulation groove 11). These land portions R1, R2, R3 are formed flat in substantially parallel to the sliding surface SB of the mating ring 8.

As described above, the negative pressure generation part (i.e., the wall portion 10*a*) of the reverse Rayleigh step 10 overlaps with the fluid discharge part of the circumferentially-adjoining reverse Rayleigh step 10' in the radial direction, and therefore, three reverse Rayleigh steps 10 are continuously arranged in the circumferential direction when the seal ring 7 is viewed from the radial direction. Thus, even when the sealing target fluid 12 leaks at any position of the seal ring 7 in the circumferential direction, the sealing target fluid 12 is sucked by the reverse Rayleigh steps 10, and therefore, leakage of the high-pressure sealing target fluid 12 to the machine outer B side can be suppressed.

Moreover, the negative pressure generation part of the reverse Rayleigh step 10 is arranged on the machine outer B side with respect to the fluid discharge part of the circumferentially-adjoining reverse Rayleigh step 10'. Thus, when the sealing target fluid 12 leaks from the fluid discharge part of the reverse Rayleigh step 10, the negative pressure generation part of the reverse Rayleigh step 10 with stronger suction force can suck such sealing target fluid 12, and therefore, leakage of the high-pressure sealing target fluid 12 to the machine outer B side can be effectively suppressed.

Further, the negative pressure generation part of the reverse Rayleigh step 10 is arranged on the machine outer B side of the Rayleigh step 9, and therefore, the sealing target fluid 12 leaking from the Rayleigh step 9 to the machine outer B side can be sucked on the negative pressure generation part of the reverse Rayleigh step 10 with stronger suction force. Consequently, leakage of the high-pressure sealing target fluid 12 to the machine outer B side can be effectively suppressed.

In addition, the fluid discharge part of the reverse Rayleigh step 10 and a fluid inflow part of the Rayleigh step 9 are connected to the inlet portion 11*a* side of the passage portion 11*c* of the fluid circulation groove 11. Thus, when the seal ring 7 and the mating ring 8 move relative to each other, the negative pressure can be reliably generated in the reverse Rayleigh step 10. Thus, leakage of the high-pressure sealing target fluid 12 from the Rayleigh step 9 to the machine outer B side can be reliably sucked.

Moreover, the fluid circulation groove 11 has the inlet portion 11*a* and the outlet portion 11*b* communicating with the machine inner A side and the passage portion 11*c*. Thus, when the seal ring 7 and the mating ring 8 move relative to each other, the sealing target fluid 12 can circulate between the fluid circulation groove 11 and the machine inner A side. With this configuration, the high-pressure sealing target fluid 12 can be reliably introduced into the Rayleigh step 9, and can be reliably discharged from the reverse Rayleigh step 10.

Further, the Rayleigh step 9 is isolated from the machine outer B side by the fluid circulation groove 11. That is, since the fluid circulation groove 11 is present on the outer diameter side of the Rayleigh step 9, leakage of the high-pressure sealing target fluid 12 from the Rayleigh step 9 to the machine outer B side can be doubly prevented by the fluid circulation groove 11 and the reverse Rayleigh step 10.

In addition, the outside-mechanical-seal-type mechanical seal 1 seals the high-pressure sealing target fluid 12 tending to leak from the inner diameter side of the sliding surfaces S7, S8 of the seal ring 7 and the mating ring 8 to an outer diameter direction, and upon sliding of the seal ring 7 and the mating ring 8, centrifugal force is on the sealing target fluid 12 between the sliding surfaces S7, S8. However, the above-described configuration can prevent leakage of the high-pressure sealing target fluid 12 from the machine inner A side to the machine outer B side.

Moreover, the wall portion 10a (i.e., a wall part of the negative pressure generation part) connecting the machine-inner-A-side wall and the machine-outer-B-side wall of the reverse Rayleigh step 10 is formed narrowed toward the machine outer B side (formed such that the acute angle is formed on the machine outer B side), and therefore, the negative pressure at the narrowed portion can be increased.

Further, the negative pressure generation part of the reverse Rayleigh step 10 is formed such that the machine-inner-A-side wall is at a position farther from the adjoining reverse Rayleigh step 10' in the circumferential direction than the machine-outer-B-side wall, and therefore, the negative pressure generation part of the reverse Rayleigh step 10 can be arranged close to the adjoining reverse Rayleigh step 10'. According to this configuration, the suction force of the reverse Rayleigh step 10 can be effectively transmitted to the sealing target fluid 12 leaking from the fluid discharge part of the adjoining reverse Rayleigh step 10'.

In addition, the end portion (i.e., the end of the fluid discharge part) of the reverse Rayleigh step 10 communicating with the inlet portion 11a side of the passage portion 11c of the fluid circulation groove 11 is inclined along the inlet portion 11a side of the passage portion 11c. Thus, a large liquid discharge region of the reverse Rayleigh step 10 can be taken, and the negative pressure is easily generated in the reverse Rayleigh step 10.

Moreover, the fluid discharge part of the reverse Rayleigh step 10 is, in the radial direction, formed at the same radial position (i.e., a position having the substantially same diameter) as that of the bent portion of the passage portion 11c of the fluid circulation groove 11. According to this configuration, the flow of the sealing target fluid 12 discharged from the reverse Rayleigh step 10 to the fluid circulation groove 11 can be smoothly made.

Further, the bent portion of the passage portion 11c of the fluid circulation groove 11 is rounded in a substantially arc shape to continue to the reverse Rayleigh step 10 in the circumferential direction. Thus, the flow of the sealing target fluid 12 discharged from the reverse Rayleigh step 10 to the fluid circulation groove 11 can be more smoothly made.

In addition, the wall portion 9a (i.e., a positive pressure generation part) connecting the machine-inner-A-side wall and the machine-outer-B-side wall of the Rayleigh step 9 is formed narrowed toward the machine inner A side. Thus, the sealing target fluid 12 can be easily discharged to the machine inner A side, and can be less discharged to the machine outer B side.

Moreover, the end portion of the Rayleigh step 9 on the inlet portion 11a side of the passage portion 11c is, in the radial direction, formed at the same radial position (i.e., a position having the substantially same diameter) as that of the fluid discharge side part of the reverse Rayleigh step 10, and therefore, the sealing target fluid 12 can be smoothly introduced into the Rayleigh step 9.

Further, the Rayleigh step 9 is arranged along the inner diameter side of the reverse Rayleigh step 10, and is arranged on the inner diameter side (i.e., the machine inner A side) with respect to the bent portion of the passage portion 11c of the fluid circulation groove 11. Thus, the length of the Rayleigh step 9 in the circumferential direction can be ensured.

In addition, the Rayleigh step 9 and the reverse Rayleigh step 10 communicate with the machine inner A side through the fluid circulation groove 11. In other words, the Rayleigh step 9 and the reverse Rayleigh step 10 do not directly communicate with the machine inner A side, and therefore, the positive pressure of the Rayleigh step 9 and the negative pressure of the reverse Rayleigh step 10 can be stably generated.

Second Embodiment

Next, a sliding component according to a second embodiment of the present invention will be described with reference to FIG. 7. Note that the same configurations as those of the above-described first embodiment will not be described.

Figure 7:
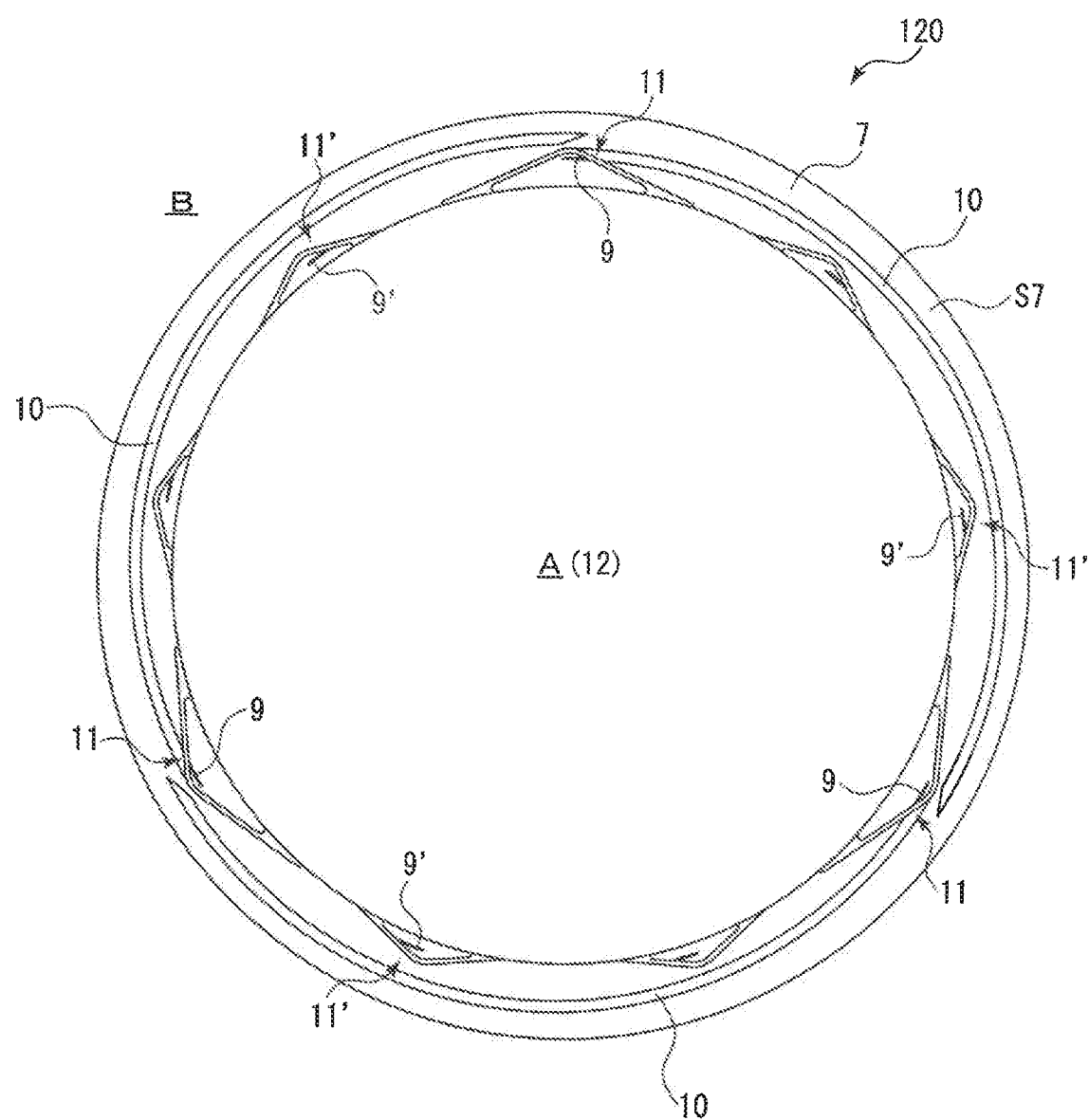
FIG. 7 is a view, from an axial direction, of a sliding surface of a seal ring included in a sliding component according to a second embodiment of the present invention.

As illustrated in FIG. 7, the sliding component forming a mechanical seal 120 is configured such that two fluid circulation grooves 11' are formed between adjoining ones of fluid circulation grooves 11 in a circumferential direction at a sliding surface S7. Each fluid circulation groove 11' is provided with a Rayleigh step 9'. That is, in the mechanical seal 120, nine fluid circulation grooves 11, 11' and nine Rayleigh steps 9, 9' are arranged at equal intervals in the circumferential direction of the sliding surface S7. As described above, the number of fluid circulation grooves 11, 11' and the number of Rayleigh steps 9, 9' are increased with respect to the first embodiment, and therefore, the function of improving sealability and lubricity by the Rayleigh steps 9, 9' can be enhanced. Note that the fluid circulation groove 11' is formed smaller than the fluid circulation groove 11 so as not to contact a reverse Rayleigh step 10. As described above, the number of fluid circulation grooves 11, 11' and the number of Rayleigh steps 9, 9' can be changed as necessary.

Third Embodiment

Next, a sliding component according to a third embodiment of the present invention will be described with reference to FIG. 8. Note that the same configurations as those of the above-described embodiments will not be described.

Figure 8:
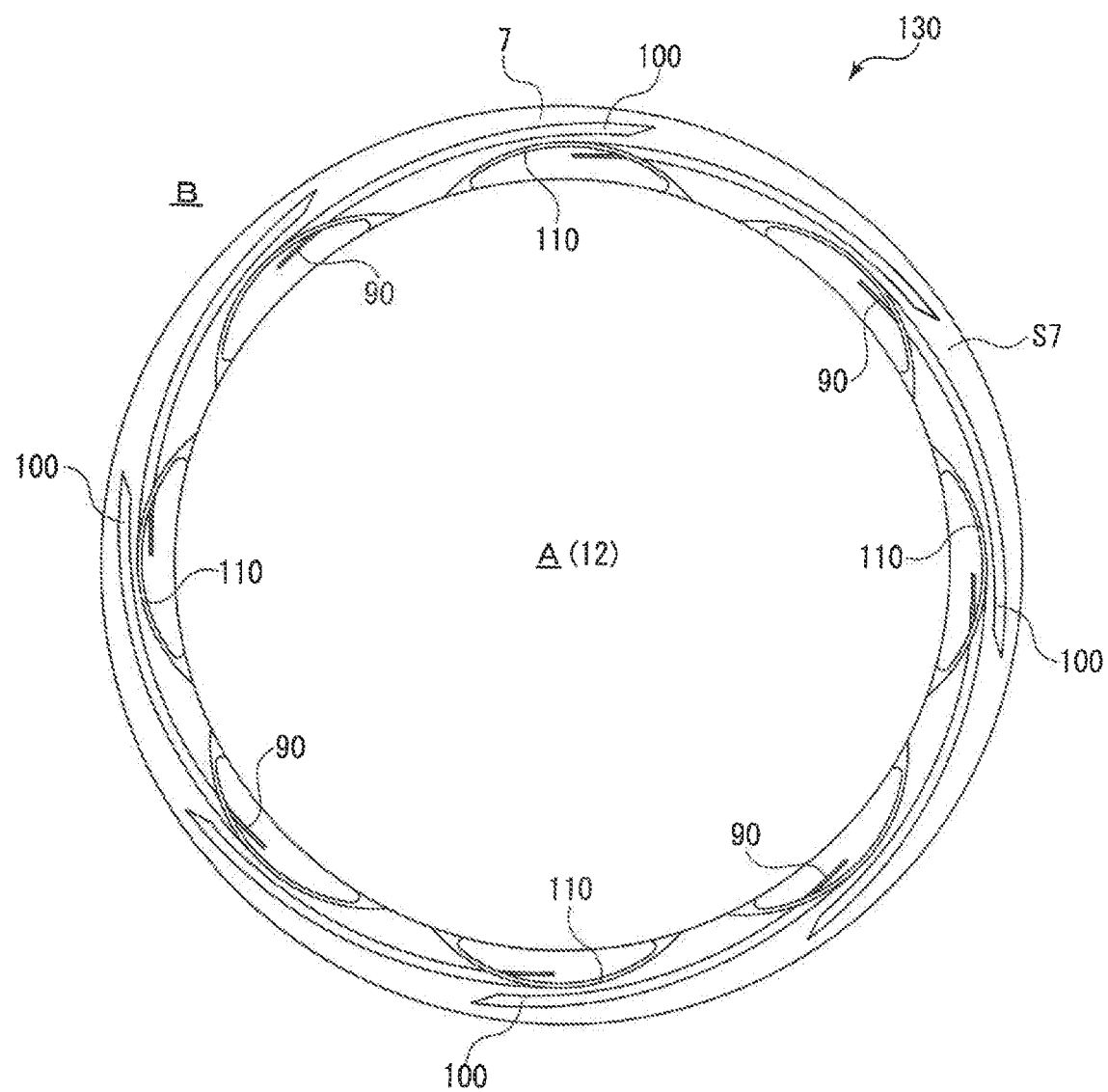
FIG. 8 is a view, from an axial direction, of a sliding surface of a seal ring included in a sliding component according to a third embodiment of the present invention.

As illustrated in FIG. 8, the sliding component forming a mechanical seal 130 is configured such that at a sliding surface S7, eight Rayleigh steps 90, eight reverse Rayleigh steps 100, and eight fluid circulation grooves 110 are arranged at equal intervals in a circumferential direction. As described above, the number of Rayleigh steps 90, the number of reverse Rayleigh steps 100, and the number of fluid circulation grooves 110 can be changed as necessary.

Moreover, the fluid circulation groove 110 is in a substantially arc shape as viewed from an axial direction. According to this configuration, no corner portion is formed at the fluid circulation groove 110, and therefore, leakage of sealing target fluid 12 from the fluid circulation groove 110 can be suppressed. As described above, the shape of the fluid circulation groove can be freely changed.

Fourth Embodiment

Next, a sliding component according to a fourth embodiment of the present invention will be described with reference to FIG. 9. Note that the same configurations as those of the above-described embodiments will not be described.

Figure 9:
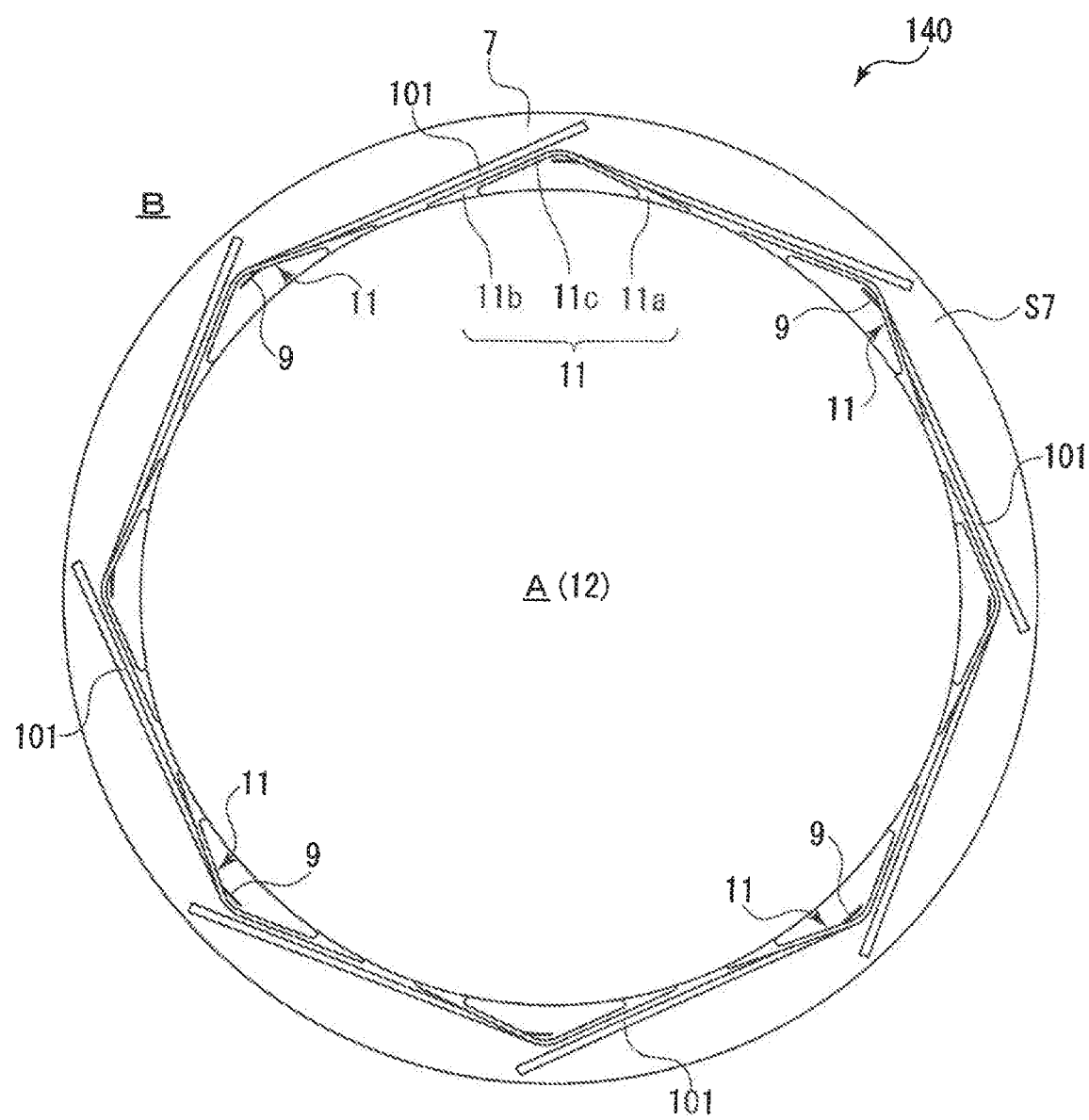
FIG. 9 is a view, from an axial direction, of a sliding surface of a seal ring included in a sliding component according to a fourth embodiment of the present invention.

As illustrated in FIG. 9, the sliding component forming a mechanical seal 140 is configured such that at a sliding surface S7, eight Rayleigh steps 9 and eight fluid circulation grooves 11 having the same configurations as those of the first embodiment are arranged at equal intervals in a circumferential direction. Each reverse Rayleigh step 101 is provided to linearly extend from a bent portion of a passage portion 11c of the fluid circulation groove 11 to a position on an outer diameter side with respect to a bent portion of a passage portion 11c of an adjoining fluid circulation groove 11. As described above, as long as the reverse Rayleigh steps are formed to continuously overlap with each other across the circumferential direction as viewed from an outer diameter direction, the shape of the reverse Rayleigh step can be freely changed.

Fifth Embodiment

Next, a sliding component according to a fifth embodiment of the present invention will be described with reference to FIG. 10. Note that the same configurations as those of the above-described embodiments will not be described.

Figure 10:
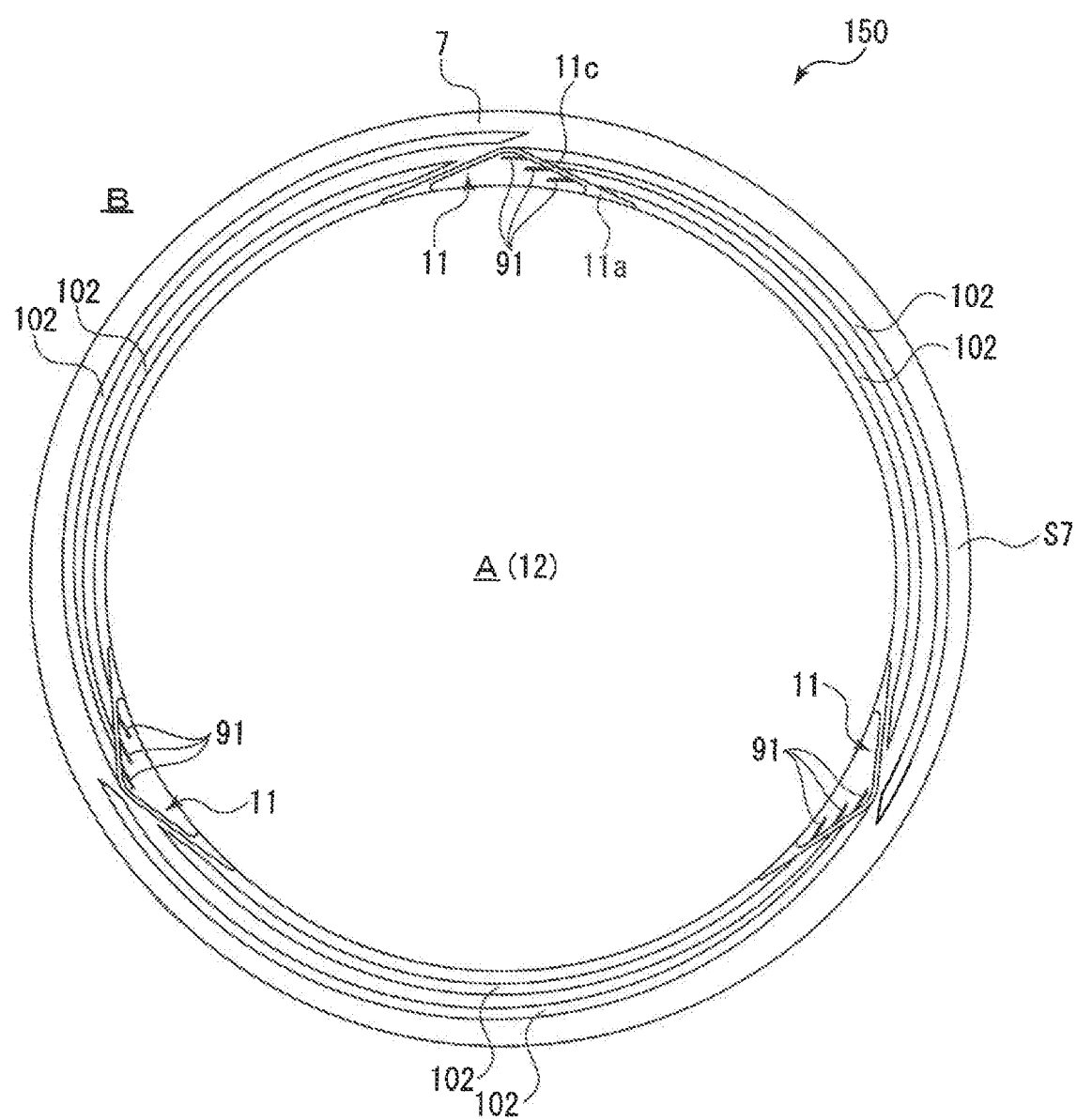
FIG. 10 is a view, from an axial direction, of a sliding surface of a seal ring included in a sliding component according to a fifth embodiment of the present invention.

As illustrated in FIG. 10, the sliding component forming a mechanical seal 150 is configured such that at a sliding surface S7, three fluid circulation grooves 11 are arranged at equal intervals in a circumferential direction as in the first embodiment. Moreover, three Rayleigh steps 91 are provided on an inlet portion 11a side of a passage portion 11c of a fluid circulation groove 11 with the Rayleigh steps 91 being shifted from each other in a radial direction, and two reverse Rayleigh steps 102 are provided on the inlet portion 11a side of the passage portion 11c of the fluid circulation groove 11 with the reverse Rayleigh steps 102 being shifted from each other in the radial direction. That is, the total of nine Rayleigh steps 91 are provided, and the total of six reverse Rayleigh steps 102 are provided. As described above, the multiple reverse Rayleigh steps 102 may be arranged in the radial direction such that the amount of sealing target fluid 12 taken by the reverse Rayleigh steps 102 is increased. Note that at least the outer-diameter-side reverse Rayleigh steps 102 may be formed to continuously overlap with each other across the circumferential direction as viewed from the radial direction.

Sixth Embodiment

Next, a sliding component according to a sixth embodiment of the present invention will be described with reference to FIG. 11. Note that the same configurations as those of the above-described embodiments will not be described.

Figure 11:
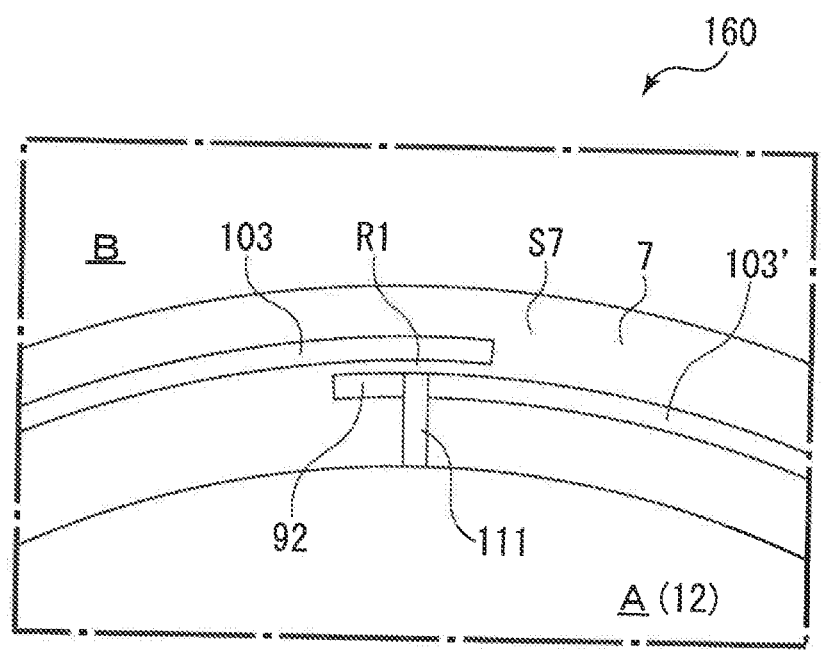
FIG. 11 is an enlarged view of a main portion of a sliding surface of a seal ring included in a sliding component according to a sixth embodiment of the present invention.

As illustrated in FIG. 11, the sliding component forming a mechanical seal 160 is configured such that a fluid introduction groove 111 extending from a machine inner A side in a radial direction is formed. A fluid inflow part of a Rayleigh step 92 and a fluid discharge part of an adjoining reverse Rayleigh step 103' are connected to both sides of the fluid introduction groove 111 in a circumferential direction. On an outer diameter side of the fluid introduction groove 111, a negative pressure generation part of the reverse Rayleigh step 103 is arranged through a land portion R1. As described above, as long as the fluid introduction groove 111 is connected to the fluid inflow part of the Rayleigh step and the fluid discharge part of the reverse Rayleigh step 103, circulation is not necessarily made.

The embodiments of the present invention have been described above with reference to the drawings. However, specific configurations are not limited to these embodiments, and changes and additions made without departing from the gist of the present invention are also included in the present invention.

For example, in the above-described embodiments, the outside-mechanical-seal-type mechanical seal configured to seal the sealing target fluid tending to leak from the inner peripheries of the sliding surfaces of the seal ring and the mating ring to the outer circumferential direction has been described, but the present invention may be applied to an inside-mechanical-seal-type mechanical seal configured to seal sealing target fluid tending to leak from the outer peripheries of sliding surfaces of a seal ring and a mating ring to an inner circumferential direction. In this case, a positive pressure generation mechanism may be provided on an outer peripheral side, and a negative pressure generation mechanism may be provided on an inner diameter side.

Moreover, the adjoining reverse Rayleigh steps may have different width, depth, and length in the circumferential direction. For example, in the above-described embodiments, the case where a bottom surface of the reverse Rayleigh step is a flat surface substantially parallel to the sliding surface has been described, but the bottom surface may cross the sliding surface or may be a curved surface. The same also applies to the Rayleigh step.

Further, the Rayleigh step 9 and the reverse Rayleigh step 10 are not necessarily provided at the sliding surface S7 of the seal ring 7. The Rayleigh step 9 and the reverse Rayleigh step 10 may be formed at the sliding surface SS of the mating ring 8, or may be formed at both of the sliding surfaces S7, S8 of the seal ring 7 and the mating ring 8.

In addition, the negative pressure generation mechanism is not limited to the reverse Rayleigh step 10. For example, as long as the negative pressure generation mechanism is in a groove shape generating the negative pressure, the shape thereof is not limited. Note that each of the negative pressure generation mechanisms may be formed by multiple grooves (e.g., spiral grooves) along the substantially circumferential direction. In this case, the group of grooves arranged in a region along the substantially circumferential direction is taken as the single negative pressure generation mechanism. The reverse Rayleigh step 10 described as an example in the above-described embodiments is particularly preferable because the reverse Rayleigh step 10 itself is in a groove shape continuously formed in the circumferential direction without disconnection.

Moreover, in the above-described embodiments, the mechanical seal 1 including the seal ring 7 and the mating ring 8 has been described as the sliding component, but, e.g., a bearing including a sliding member fixed to a housing side and another sliding member fixed to a rotary shaft side may form the sliding component.

REFERENCE SIGNS LIST

1 Mechanical seal (Sliding component)
2 Housing
3 Rotary shaft
7 Seal ring (One sliding member)
8 Mating ring (Another sliding member)
9, 9' Rayleigh step (Positive pressure generation mechanism)
9a Wall portion (Positive pressure generation part of Rayleigh step)
10, 10' Reverse Rayleigh step (Negative pressure generation mechanism)
10a Wall portion (Negative pressure generation part of reverse Rayleigh step)
11, 11' Fluid circulation groove (Fluid introduction groove)
11a Inlet portion
11b Outlet portion
11c Passage portion
12 Sealing target fluid
90, 91, 92 Rayleigh step (Positive pressure generation mechanism)

100, 101, 102 Reverse Rayleigh step (Negative pressure generation mechanism)
103, 103' Reverse Rayleigh step (Negative pressure generation mechanism)
110 Fluid circulation groove (Fluid introduction groove)
111 Fluid introduction groove
120 to 160 Mechanical seal (Sliding component)
A Machine inner side
B Machine outer side
R1, R2, R3 Land portion
S, S7, S8 Sliding surface

The invention claimed is:

1. A sliding component comprising a pair of sliding members at least one of which has positive pressure generation mechanisms and negative pressure generation mechanisms formed at a sliding surface of the sliding member, the negative pressure generation mechanisms being arranged on a low-pressure fluid side with respect to the positive pressure generation mechanisms, wherein
adjoining two of the negative pressure generation mechanisms in a circumferential direction overlap with each other in a radial direction.

2. The sliding component according to claim 1, wherein each of the negative pressure generation mechanisms has a negative pressure generation part and a fluid discharge part, the negative pressure generation part of a first one of the adjoining two of the negative pressure generation mechanisms is arranged on the low-pressure fluid side with respect to the fluid discharge part of a second one of the adjoining two of the negative pressure generation mechanisms.

3. The sliding component according to claim 2, wherein each of the negative pressure generation mechanisms is a reverse Rayleigh step.

4. The sliding component according to claim 3, wherein each of the positive pressure generation mechanisms is a Rayleigh step having a fluid inflow part, and
the sliding member has, at the sliding surface thereof, a fluid introduction groove connecting the fluid discharge part of the reverse Rayleigh step and the fluid inflow part of the Rayleigh step to a high-pressure fluid side.

5. The sliding component according to claim 4, wherein the fluid introduction groove is a circulation groove having an inlet and an outlet both of which communicate with the high-pressure fluid side.

6. The sliding component according to claim 5, wherein the Rayleigh step is isolated from the low-pressure fluid side by the circulation groove.

7. The sliding component according to claim 6, wherein the low-pressure fluid side is an outer diameter side of the sliding member, and
the high-pressure fluid side is an inner diameter side of the sliding member.

8. The sliding component according to claim 5, wherein the low-pressure fluid side is an outer diameter side of the sliding member, and
the high-pressure fluid side is an inner diameter side of the sliding member.

9. The sliding component according to claim 4, wherein the low-pressure fluid side is an outer diameter side of the sliding member, and
the high-pressure fluid side is an inner diameter side of the sliding member.

10. The sliding component according to claim 3, wherein the low-pressure fluid side is an outer diameter side of the sliding member, and
the high-pressure fluid side is an inner diameter side of the sliding member.

11. The sliding component according to claim 2, wherein the low-pressure fluid side is an outer diameter side of the sliding member, and
the high-pressure fluid side is an inner diameter side of the sliding member.

12. The sliding component according to claim 1, wherein the low-pressure fluid side is an outer diameter side of the sliding member, and
the high-pressure fluid side is an inner diameter side of the sliding member.

* * * * *